March 24, 1953    K. D. SWARTZEL ET AL    2,632,881
APPARATUS FOR AURALLY PRESENTING GUIDANCE INFORMATION
Filed Jan. 12, 1951
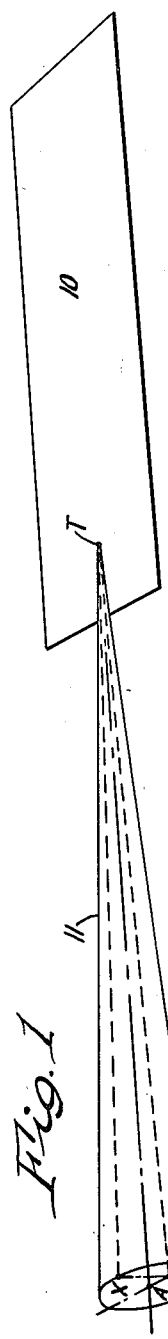
INVENTORS
Karl D. Swartzel
Jack Beneke
Neil J. Waterman
BY Popp and Sommer
ATTORNEYS.

Patented Mar. 24, 1953

2,632,881

UNITED STATES PATENT OFFICE 2,632,881

APPARATUS FOR AURALLY PRESENTING GUIDANCE INFORMATION

Karl D. Swartzel, Amherst, Jack Beneke, Williamsville, and Neil J. Waterman, Hamburg, N. Y., assignors, by mesne assignments, to Research Corporation, New York, N. Y., a corporation of New York Application January 12, 1951, Serial No. 205,821

13 Claims. (Cl. 340—26)

This invention relates to apparatus for aurally presenting guidance information for the navigation or guidance of crafts, and more particularly to apparatus which indicates to a pilot binaurally the position of his aircraft with respect to a reference point on the ground.

The invention has particular application in connection with the conventional instrument landing system by which a concentrated sloping beam is transmitted from the landing strip and which is used for the landing approach of the aircraft by indicating the vertical and lateral displacement of the aircraft with respect to the axis of the beam. In the conventional instrument landing system referred to, a cross-pointer indicator is provided in the aircraft to indicate the vertical and lateral off-course displacements. With the present invention the need for visual attention to the cross-pointer indicator is removed through the substitution of the aural sense. Thus the pilot's visual attention is partially freed for greater concentration on other aspects of his landing procedure and the approach can be made with greater security and safety.

In accordance with the invention, lateral departure from the axis of the guide beam is indicated by means of a varying phase-intensity relationship between sounds reaching a pilot's two ears through conventional earphones. The direction-localization effect achieved by this means is proportional to angular departure horizontally of the actual flight path from the axis of the guide beam. Vertical departure from the axis of the guide beam is indicated through a tone of varying pitch which is related to a tone of constant pitch as actual altitude is related to the axis of the guide beam. These two elements of guidance information are preferably contained within a dot-dot-dash signal heard by the pilot at intervals.

It has been found that the dot-dot-dash patterned tone should have a fundamental pitch of approximately 600 cycles per second with higher harmonics; which complex tone can be presented to the pilot by shifting the entire pattern binaurally or by shifting only the dots binaurally while the dash remains "centered" as a reference. In either case the binaurally shifted portion of the signal appears primarily in the left or right ear or in both ears in correspondence with off-course left, off-course right or on-course conditions respectively. The practice of binaurally shifting the dots only and "centering" the dash is preferred and apparatus for carrying out such procedure will be described in detail hereinafter.

The vertical or glide path guidance signal consists of a pitch difference between the dot-dot tone, which is variable, and the dash tone which is of constant frequency. Thus high, normal and low glide paths are given by dots of higher pitch than standard reference dashes, dots of the same pitch as dashes, and dots of lower pitch than dashes, respectively. The pitch differential is preferably ±10% of the reference dash tone frequency and is continuously variable over the recommended range of safe altitudes for instrument let-downs.

The system of lateral guidance described above, i. e. turn right when signal is prominent in the left ear, and vice versa, is seen to be opposite to the phenomenon of binaural localization of sound direction with the unaided ears. It does, however, conform with existing practices in radio-range guidance, i. e. flying away from the code received to reach the beam center. It is therefore a matter of choice as to whether the apparent direction of source of sound is to be followed or turned away from but experienced pilots prefer turning away from the sound and such technique introduces no conflict with practices in other fields of hearing.

Fig. 1 is a perspective schematic view of a landing strip equipped with a conventional instrument landing system and showing the beam of this system sloping upwardly from and in line with the landing strip and further showing the actual position of the aircraft above and to the right of the beam center.

Fig. 2 is a schematic view of the apparatus arranged in the aircraft and embodying the present invention.

The aural guidance system is illustrated in connection with the conventional instrument landing system and uses an aural method of guidance presentation to supplement visual sensing of the conventional cross-pointer instrument carried by the aircraft.

Referring to Fig. 1, the numeral 10 represents a landing strip from which a beam 11 of the transmitter T of the conventional instrument landing system slants upwardly and in line with the landing strip. For illustrative purposes the actual position of the aircraft with respect to the axis TA of the beam 11 is represented at X. The letter B represents a point vertically below the aircraft X and in horizontal alinement with the point A.

In accordance with the conventional instrument landing system, the aircraft carries the usual glide path receiver and localizer receiver represented at 12 and 13 respectively in Fig. 2. Voltages developed in these receivers are used to actuate a conventional cross-pointer indicator 14 of the galvanometer type which has pivoted pointers 15 and 16 normally intersecting at right angles to each other and adapted to move from their respective normal positions to indicate the extent of horizontal and vertical deviation of the aircraft from the center axis AT of the beam 11. Lines 18 and 19 are shown as transmitting the error voltage output of the glide path receiver 12 to the pointer 16 and lines 20 and 21 transmit the error voltage output of the localizer receiver 13 to the pointer 15.

The magnitude of the error voltage put out by the glide path receiver 12 is essentially proportional to the tangent of the angle XTB for vertical displacement. The magnitude of the error voltage put out by the localizer receiver 13 is essentially proportional to the tangent of the angle ATB for lateral displacement. This comes about because of the nature of the beam 11, that is, the maximum error is indicated whenever the defined limits of safety are reached, whether the aircraft is just entering the beam or is near touch down. Therefore, as touch down is approached the permissible linear departures from the center axis AT of the beam 11 become smaller and smaller while the values of the tangents of the angles XTB and ATB can remain constant.

The position X of the aircraft is to the right and above the central axis of the beam 11. Now referring to the cross-pointer indicator 14 in Fig. 2, this position of the aircraft is indicated by the intersection of the pointers 15 and 16 to the lower left of the center of the dial of the indicator. This informs the pilot that he should then steer his aircraft to the left and down in order to make the pointers 15 and 16 intersect at the center of the indicator dial.

In accordance with the present invention, D. C. error voltages developed in the receivers 12 and 13, and ordinarily used to drive only the cross-pointer indicator 14, are also fed into the aural equipment, there to control audible error signals for the pilot's guidance.

Lateral displacements from the axis AT of the guide beam 11 are indicated by means of a varying intensity-phase relationship between tones reaching the pilot's two ears through conventional earphones which have been merely rewired for adaption to the present invention. The varying intensity-phase relationship of the tones produce a sound source localization effect which creates the psychological impression of the sound seemingly coming from the right or left or straight ahead depending upon the adjustment of the intensity-phase relationship. Vertical departures from the axis AT of the guide beam are represented by a tone of varying pitch. These sounds locate the pilot with respect to the "on course" or beam axis AT.

The two elements of guidance information are preferably contained within a dot-dot-dash signal heard by the pilot at two second intervals. The "dash" is a reference signal and remains at constant pitch and is also preferably presented with equal intensity and no relative phase shift to the two earphones, or in other words is "centered" laterally in the head set, while the "dot-dot" carries error information. Thus, predominance of the "dot-dot" in the right ear is preferably arranged to indicate a displacement of the aircraft to the right of the beam axis, and vice versa. Similarly, if the "dot-dot," is of higher frequency than the "dash" the altitude displacement is above the beam axis, and vice versa. Error signal magnitudes are continuously variable within the safe limits set forth by the Civil Aeronautics Authority for instrument landing approaches.

The apparatus schematically illustrated in Fig. 2 is suitable for carrying out the entire binaural system described above. In general, such apparatus comprises an audio oscillator 22, the frequency of which can be varied by voltage control about 10% above and below an approximately 600 cycle per second center frequency, which supplies its output through a volume control 23, a keyer 24 and an error signal relay 25, to a binaural amplifier 26. Output of the binaural amplifier is delivered to a rewired conventional headset 27.

The construction of the oscillator 22 for producing a constant frequency of approximately 600 cycles and which can be varied ±10% by voltage control, is known to those skilled in the electronic art and hence its detailed construction is not illustrated herein. For example, the oscillator 22 can be of the phantastron type described on page 195 et seq. of Waveforms, volume 19 of Massachusetts Institute of Technology Radiation Laboratory Series, a book published by McGraw-Hill Book Company, Inc. of New York, New York. A double screen-coupled phantastron is particularly suitable for the application of the present invention. Phantastron circuits are relaxation oscillators and are characterized by a linear timing waveform so that their output can be made a linear function of an input control voltage.

Referring again to Fig. 2, the input control voltage is fed into the oscillator 22 through the line 28 which is connected with an armature 29 of the error signal relay 25 which is of the multiple armature type. The fixed contacts associated with the relay armature 29 are indicated at 30 and 31. The fixed contact 30 is shown as connected to a source 32 of standard voltage while the other fixed contact 31 is shown as connected to a D. C. amplifier 33. This D. C. amplifier 33 is shown as connected by the lines 34 and 35 to the error voltage output lines 18 and 19 respectively of the glide path receiver 12. Thus when the armature 29 engages the fixed contact 30 as shown, a standard voltage is fed into the oscillator 22 so as to cause it to generate a signal of about 600 cycle frequency. However, when the error signal relay 25 is energized so as to swing the armature 29 into engagement with the fixed contact 31, an error voltage will be fed into the oscillator 22 in accordance with the degree and direction of vertical displacement of the aircraft above or below the center axis AT of the guide beam 11. The D. C. amplifier 33 has a frequency zero set so that if there is no vertical displacement, a voltage equal to the standard voltage source 32 will be applied to the line 29. However, if the voltage output of the D. C. amplifier 33 is lower the higher will be the frequency of the signal put out by the oscillator 22, and vice versa.

The keyer 24 serves to interrupt the signal output of the oscillator 22 to produce the dot-dot-dash tone pattern. As shown the keyer 25 comprises a constant speed motor 38 which drives a shaft 39 at the desired speed, a keying cam 40 fast to this shaft and having on its periphery a salient 41 of substantial circumferential extent and a pair of spaced salients 42 and 42a of relatively lesser circumferential extent, and a movable contact 43 engaging said periphery and opposed to a fixed contact 44. The contacts 43 and 44 constitute a switch which is arranged in the output line 45 of the oscillator 22. Thus as the keying cam 40 rotates the salient 41 will move the contact 43 into engagement with the fixed contact 44 and hold the same closed until the full circumferential extent of the salient 41 traverses the movable contact 43. This produces the dash tone. During continued rotation of the keying cam 40 the salients 42 and 42a which are spaced from each other and also from the longer salient 41 will successively engage the movable contact 43 to energize the output line 45 and thereby produce the dot tones. By rotating the keying cam 40 at 30 R. P. M. a dot-dot-dash tone pattern will be produced at the desired two-second intervals.

The error signal relay 25 is energized by a pair of lines 48 and 49 and is shown as controlled by a switch arranged in the line 49. This switch comprises a fixed contact 50 and a movable contact 51. This movable contact 51 is shown as riding on the periphery of a relay cam 52 which is fast to the shaft 39. The relay cam 52 has a salient 53 on its periphery which is of a circumferential extent slightly greater than that between the remote ends of the salients 42 and 42a of the keying cam 40. Further the relay cam 52 and keying cam 40 are arranged on the shaft 39 relative to each other so that the salient 53 on the former is axially opposite from and centered with respect to the salients 42 and 42a on the latter. Thus during rotation of the shaft 39, the error signal relay 25 is deenergized when the oscillator 22 is producing the reference dash tone and energized when the oscillator is producing the error information carrying or indicating dot-dot tone.

Turning now to a description of the binaural amplifier 26, this amplifier is of the push-pull type. Two lines 58 and 59 form D. C. voltage control lines and lead from a voltage control source as hereinafter described. The line 58 connects directly with the grid of a high gain pentode 60 and the line 59 connects directly with the grid of a similar high gain pentode 60a. Each of these grids is provided with the usual grid leak resistor 61 and 61a to ground and the cathodes of these tubes are connected to ground through a common cathode bias resistor 62 and cathode by-pass capacitor 63.

The plate current from each tube 60 and 60a passes through a corresponding plate resistor 64 and 64a which are directly connected to the B supply and through a bypass capacitor 65 to ground. The screen grid of each tube 60 and 60a is connected with the B supply through a corresponding resistor 66 and 66a and through a common resistor 68, each screen grid also having the usual bypass capacitor 69 and 69a to ground respectively. One side of the earphones 70 and 70a of the headset indicated generally at 27, is grounded and the other side of the earphone 70 is connected through a blocking capacitor 71 to the plate of the tube 60. Similarly the other side of the earphone 70a is connected through a blocking capacitor 71a to the plate of the tube 60a.

The output line 45 of the oscillator 22 is connected with the voltage control lines 58 and 59 through corresponding blocking capacitors 72 and 72a.

The voltage control lines 58 and 59 are shown as adapted to be connected either to a standard voltage source 73 or to the error voltage output of the localizer receiver 13. To this end the voltage control lines 58 and 59 are connected to other armatures 74 and 75 respectively of the error signal relay 25. The armature 74 has two fixed contacts 78 and 79 and the armature 75 has two fixed contacts 80 and 81. The corresponding contacts 79 and 81 are connected with the standard voltage source 73 and the corresponding contacts 78 and 80 are connected with the error voltage output of a D. C. amplifier 82. Lines 83 and 84 serve as input lines for this amplifier 82 and are connected with the error voltage output lines 20 and 21 respectively of the localizer receiver 13. The armatures 74 and 75 are shown as contacting the respective fixed contacts 79 and 81 so as to couple the voltage control lines 58 and 59 to the standard voltage source 73.

All three armatures 29, 74 and 75 are caused to close with their respective fixed contacts 31, 78 and 80 when the error signal relay 25 is energized and when deenergized these armatures return to engagement with their respective fixed contacts 30, 79, and 81 as shown.

Thus when the error signal relay 25 is deenergized the oscillator 22 is connected with its standard voltage source 32 and the binaural amplifier 26 is connected with its standard voltage source 73. This causes the oscillator to develop an A. C. signal of the centered frequency of about 600 cycles per second and an equal D. C. control voltage to be applied to both sides of the binaural amplifier 26.

When, however, the error signal relay 25 is energized the oscillator 22 is connected with the error voltage put out by the glide path receiver 12 and the binaural amplifier 26 is connected with the error voltage put out by the localizer receiver 13. The more negative the D. C. voltage of one of the lines 58 and 59 relative to the other the greater the intensity of the tone signal produced in the corresponding earphone. Thus if the voltage of line 58 is negative with respect to the voltage of the line 59, the greater the intensity of loudness of the tone signal in the earphone 70, and vice versa with respect to the other earphone 70a.

The binaural amplifier 26 also produces a phase shift in the two tone signals produced in the earphones 70 and 70a depending upon the voltage differential between the lines 58 and 59. This phase shift coupled with the difference in intensity of the sounds in the earphones produces the desired psychological sound localization effect to inform the pilot binaurally of the actual position of the aircraft with respect to the axis AT of the guide beam 11.

Therefore, according to the operation of the apparatus embodying the present invention, during the dash portion of the keyer cycle, the oscillator 22 and binaural amplifier 26 are connected, through the error signal relay 25, to standard voltage sources which provide the dash tone with its characteristic lateral "centering" and pitch in the earphones 70 and 70a. The dash tone pitch is the oscillator center frequency of about 600 cycles.

During the dot-dot portion of the keyer cycle, the error signal relay 25 is energized or closed so as to permit the error voltages developed in the receivers 12 and 13 to pass through the respective D. C. amplifiers 33 and 82 to the oscillator 22 and binaural amplifier 26 where the proper tonal and binaural shifts occur.

Frequency changes of the oscillator 22 are in direct proportion to the vertical error voltage supplied, while binaural shifts are in direct proportion to the lateral error voltage supplied.

Power for the oscillator 22, motor 38, binaural amplifier 26, D. C. amplifiers 12 and 13 and standard voltages 32 and 73 is derived from the aircraft supply in any suitable manner.

A lead 85 from the aircraft communications receiver (not shown) is provided so that control tower conversation and weather information can be heard with the earphones 70 and 70a. For this purpose the lead 85 is shown as connected to the earphones 70 and 70a through resistors 86 and 86a respectively.

In operation, as the aircraft enters the beam 11 the pilot hears a periodic dot-dot-dash signal in his earphones 70 and 70a. This tone pattern is supplied by the rotating keying cam 40, the salient 41 closing the contacts 43 and 44 to supply the dash tone and the two salients 42, 42a closing these contacts to supply the dot-dot tone.

In the event that the aircraft enters the beam 11 above the axis AT of the beam, the pilot will hear the dash tone at a standard pitch of, say 600 cycles per second, but he will hear the dot-dot tone at a higher pitch depending upon the extent of the vertical departure of the aircraft above the axis AT. The dash tone is heard at the standard reference frequency because each time the contacts 43 and 44 are closed by the large or "dash" salient 41 of the keying cam 40, the contacts 50 and 51 of the relay cam 52 are open and the relay 25 is deenergized. Accordingly standard voltage from the source 32 is supplied through the closed contacts 30 and 29 of the relay 25 to the oscillator 22 so that its output is at the assumed reference frequency of 600 cycles, this output being amplified by the binaural amplifier 26 and conducted to the headset 27.

The pitch of the dot-dot tone at this time is higher than the pitch of the reference dash tone because at the time the two smaller "dot" salients 42 and 42a of the keying cam 40 close the contacts 43 and 44 the contacts 50 and 51 are closed by the salient 53 of the relay cam 52 and hence the relay 25 is energized. Hence at this time voltage supplied to the oscillator 22 is from the amplifier 33 under control of the glide path receiver 12 through the contacts 31 and 29 to the oscillator 22. The voltage so supplied when the aircraft is above the axis AT is lower than the standard voltage supplied at 32 and since the oscillator 22 produces a higher frequency with reduced input control voltages, its output signal conducted to the headset 27 through the binaural amplifier 26 will be at a higher frequency during the dot-dot tone than that of the reference dash tone. Accordingly the pilot knows that to follow the axis AT he must steer the aircraft downwardly.

Conversely, if the aircraft enters the beam 11 below the axis AT thereof, the pitch of the dot-dot tone will be below that of the reference dash tone and the pilot is informed to steer the aircraft upwardly to aline with the axis AT.

Assuming the aircraft enters the beam 11 to the right of the axis AT thereof, the pilot hears the reference dash tone with equal intensity and in phase in both earphones 70 and 70a. However he hears the dot-dot tone in his right earphone 70a with greater intensity than in his left earphone 70. Also, the phasing is such that he hears the dot-dot tone in the right earphone 70a slightly in advance of the dot-dot tone in the left earphone 70. The psychological effect of this difference in intensity and phase in the two earphones is such that the sound appears to come from the right.

The dash tone is in phase and of equal intensity in both earphones 70 and 70a because at the time that the contacts 43 and 44 are closed by the large "dash" salient 41 of the keying cam 40 the contacts 50 and 51 are open and hence the relay 25 is deenergized. Accordingly standard voltage from the source 73 is applied to both sides of the binaural amplifier 26 through the respective sets of closed contacts 74, 79 and 75, 81.

The dot-dot tone at this time is, however, supplied to the right earphone 70a with greater intensity and slightly in phase advance of the dot-dot tone supplied to the left hand earphone 70 because at the time the two smaller "dot" salients 42 and 42a of the keying cam 40 close the contacts 43 and 44, the contacts 50 and 51 are closed by the salient 53 of the relay cam 52 and hence the relay 25 is energized. Hence at this time control voltage supplied to the sides 58 and 59 of the binaural amplifier 26 is from the amplifier 82 under control of the localizer receiver 13 and through the closed contacts 74 and 78 to the side 58 and through the closed contacts 75 and 80 to the other side 59. The voltage so supplied through the line 59 of the binaural amplifier 26 is more negative than the voltage supplied through the line 58 thereof when the aircraft is to the right of the axis AT of the beam 11. Accordingly the dot-dot tone will be heard at greater intensity in the right hand earphone 70a than in the left hand earphone 70. The push-pull binaural amplifier 26 also is effective to produce a phase shift between these two tones such that the louder signal leads the weaker signal. With these conditions, psychologically the pilot hears the sound as coming from the right and knows that to follow the axis AT he must steer the aircraft to the left.

Conversely, if the aircraft enters the beam 11 to the left of the axis AT thereof, the dot-dot tone in his left earphone 70 is louder and slightly in phase advance of the dot-dot tone from his right earphone 70a. Accordingly the sound appears to come from his left and he is informed to steer the aircraft to the right in order to aline with the axis AT.

By "earphone" as used herein and in the appended claims is meant any sound producing device suitable for the purposes of the invention.

We claim:

1. Apparatus for binaurally presenting guidance information, comprising audio oscillator means arranged to produce a periodic signal output pattern including alternately a reference portion having a standard frequency and an error information carrying portion capable of having a variable frequency, a pair of earphones, means actuated in response to said periodic signal output pattern to produce a similar periodic tone pattern in said earphones, and means arranged to vary the relative intensity and phase of the tones in said earphones in response to lateral deviation of course determined with respect to the axis of a guide beam.

2. Apparatus for aurally presenting guidance information, comprising an audio oscillator arranged to produce a signal output of variable frequency in response to control voltage applied thereto, an earphone, means arranged to produce a variable tone in said earphone in response to the frequency of said signal output, a standard voltage source, a second voltage source, means arranged to vary the potential of said second voltage source in response to vertical deviation of course determined with respect to the axis of a guide beam, and means arranged to apply periodically and alternately the potential from said standard and second voltage sources to said oscillator, whereby a tone of constant pitch and one of variable pitch are alternately produced in said earphone.

3. Apparatus for binaurally presenting guidance information, comprising audio oscillator means arranged to produce a periodic signal output pattern including alternately a reference portion having a standard frequency and an error information carrying portion capable of having a variable frequency, a pair of earphones, means actuated in response to said periodic signal output pattern to produce a similar periodic tone pattern in said earphones, means arranged to vary the relative intensity and phase of the tones in said earphones in response to lateral deviation of course determined with respect to the axis of a guide beam, and means arranged to vary the frequency of said error information carrying portion only of said signal output pattern in response to vertical deviation of course determined with respect to said axis thereby to vary the pitch of the error information carrying portion of said tone pattern with respect to the reference portion thereof.

4. Apparatus for binaurally presenting guidance information, comprising audio oscillator means arranged to produce a periodic signal output pattern including alternately a reference portion having a standard frequency and an error information carrying portion capable of having a variable frequency, a pair of earphones, means actuated in response to said periodic signal output pattern to produce a similar periodic tone pattern in said earphones, means arranged to vary the relative intensity and phase of the tones in said earphones during only the error information carrying portion of said tone pattern and in response to lateral deviation of course determined with respect to the axis of a guide beam, and means arranged to vary the frequency of said error information carrying portion only of said signal output pattern in response to vertical deviation of course determined with respect to said axis thereby to vary the pitch of said error information carrying portion of said tone pattern with respect to said reference portion thereof.

5. Apparatus for binaurally presenting guidance information, comprising an audio oscillator arranged to produce a signal output, a pair of earphones, means actuated in response to said signal output to produce a tone in each of said earphones and of an intensity and phase responsive to a variable control voltage, a voltage source for each of said earphones, and means arranged to vary the potential of said voltage sources in response to lateral deviation of course determined with respect to the axis of a guide beam thereby to vary the relative intensity and phase of the tones in said earphones.

6. Apparatus for binaurally presenting guidance information, comprising an audio oscillator arranged to produce a signal output, a pair of earphones, means actuated in response to said signal output to produce a tone in each of said earphones and of an intensity and phase responsive to a variable control voltage, a standard voltage source, a second voltage source for each of said earphones, means arranged to vary the potential of said second voltage sources in response to lateral deviation of course determined with respect to the axis of a guide beam, and means arranged to apply periodically and alternately the potential from said standard and second voltage sources to said earphones thereby to vary the relative intensity and phase of the tones in said earphones when under control of said second voltage sources.

7. Apparatus for binaurally presenting guidance information, comprising an audio oscillator arranged to produce a signal output, a push-pull amplifier having each side provided with an input line and an output line, a line connecting the output of said oscillator with both of the input lines of said amplifier, a pair of earphones each of which is in circuit with a corresponding output line of said amplifier, a standard voltage source, a second voltage source for each of said earphones, means arranged to vary the potential of said second voltage sources in response to lateral deviation of course determined with respect to the axis of a guide beam, and means arranged to apply periodically and alternately the potential from said standard and second voltage sources to said input lines of said amplifier thereby to vary the relative intensity and phase of the tones in said earphones when under control of said second voltage sources.

8. Apparatus for aurally presenting guidance information, comprising an audio oscillator arranged to produce a signal output of variable frequency in response to input control voltage applied thereto, means arranged to interrupt periodically said output, an earphone, means arranged to produce a variable tone in said earphone in response to the frequency of the interrupted signal output, a standard voltage source, a second voltage source, means arranged to vary the potential of said second voltage source in response to vertical deviation of course determined with respect to the axis of a guide beam, and a relay energized and deenergized in synchronism with said interrupting means and having contacts alternately connecting said oscillator input with said standard voltage source and said second voltage source, whereby a periodically repeated pattern of distinct alternate tones of constant and variable pitch are produced in said earphone.

9. Apparatus for binaurally presenting guidance information, comprising an audio oscillator arranged to produce a signal output, means arranged to interrupt periodically said output, a pair of earphones, means arranged to produce a tone in both of said earphones in response to the frequency of said interrupted signal output, a standard voltage source, a second voltage source for each of said earphones, means arranged to vary the potential of said second voltage sources in response to lateral deviation of course determined with respect to the axis of a guide beam, and a relay energized and deenergized in synchronism with said interrupting means and having contacts alternately connecting said tone producing means with said standard voltage source and said second voltage sources, thereby to vary the relative intensity and phase of the tones in said earphones when under control of said second voltage sources.

10. Apparatus for binaurally presenting guidance information, comprising an audio oscillator arranged to produce a signal output of variable frequency in response to input control voltage applied thereto, means arranged to interrupt periodically said output, a pair of earphones, means arranged to produce a tone in both of said earphones in response to the frequency of the interrupted signal output and of a relative intensity and phase in said earphones responsive to a variable control voltage, a standard voltage source, a second voltage source, means arranged to vary the potential of said second voltage source in response to vertical deviation of course determined with respect to the axis of a guide beam, another standard voltage source, a fourth voltage source for each of said earphones, means arranged to vary the potential of said fourth voltage sources in response to lateral deviation of course determined with respect to said axis, and a relay energized and deenergized in synchronism with said interrupting means and having contacts alternately connecting said oscillator input with said first standard and second voltage sources and also said tone producing means with said another standard and fourth voltage sources.

11. In an instrument landing system for aircrafts and having a glide path receiver and a localizer receiver each of which is adapted to develop an error voltage in response to vertical and lateral deviations respectively from the axis of a guide beam, the combination therewith of apparatus for binaurally presenting information regarding such deviations, comprising an audio oscillator arranged to produce a signal output of variable frequency in response to control voltage applied thereto, a pair of earphones, means operatively associated with said oscillator and said localizer receiver and arranged to produce in both of said earphones a tone having a variable pitch responsive to the frequency of said signal output and also having a relative intensity and phase relation in response to said error voltage from said localizer receiver, a standard voltage source, and means arranged to apply periodically and alternately to said oscillator the potential from said standard voltage source and said error voltage from said glide path receiver.

12. In an instrument landing system for aircrafts and having a glide path receiver and a localizer receiver each of which is adapted to develop an error voltage in response to vertical and lateral deviations respectively from the axis of a guide beam, the combination therewith of apparatus for binaurally presenting information regarding such deviations, comprising an audio oscillator arranged to produce a signal output of variable frequency in response to control voltage applied thereto, a pair of earphones, means arranged to produce in both of said earphones a tone having a variable pitch responsive to the frequency of said signal output and also having a variable relative intensity and phase relation responsive to a control voltage applied to such means, a standard voltage source, means arranged to apply periodically and alternately to said oscillator the potential from said standard voltage source and said error voltage from said glide path receiver thereby to provide in said earphones a tone pattern having a reference portion of constant pitch when the standard voltage is applied and an error information carrying portion of variable pitch when the error voltage is applied, another standard voltage source, and means operative simultaneously with said last mentioned means and arranged to apply periodically and alternately to said first mentioned means the potential from said another voltage source and the error voltage from said localizer receiver thereby to provide in said earphones said reference tone portion with the same intensity and no phase shift when the standard voltage is applied and said error information carrying tone portion with a relative intensity and phase shift when the error voltage is applied.

13. In an instrument landing system for aircrafts and having a glide path receiver and a localizer receiver each of which is adapted to develop an error voltage in response to vertical and lateral deviations respectively from the axis of a guide beam, the combination therewith of apparatus for binaurally presenting information regarding such deviations, comprising an audio oscillator arranged to produce a signal output of variable frequency in response to control voltage applied thereto, means arranged to interrupt said output periodically, a push-pull amplifier having each side provided with an input line and an output line, a line connecting said output of said oscillator with both of said input lines of said amplifier, a pair of earphones each of which is in circuit with a corresponding output line of said amplifier, a standard voltage source, a second standard voltage source, and a relay energized and deenergized in synchronism with said interrupting means and having contacts alternately connecting said oscillator input with said first standard voltage source and with said error voltage from said glide path receiver thereby to provide in said earphones a tone pattern having a reference portion of constant pitch when the standard voltage is applied and an error information carrying portion of variable pitch when the error voltage is applied and said contacts also alternately connecting said amplifier input lines with said second standard voltage source and with said error voltage from said localizer receiver thereby to provide in said earphones said reference tone portion with the same intensity and no phase shift when the standard voltage is applied and said error information carrying tone portion with a relative intensity and phase shift when the error voltage is applied.

KARL D. SWARTZEL.
JACK BENEKE.
NEIL J. WATERMAN.

REFERENCES CITED

The following references are of record in the file of this patent:

UNITED STATES PATENTS

| Number | Name | Date |
|---|---|---|
| 2,157,122 | Dunmore | May 9, 1939 |
| 2,436,479 | Luck | Feb. 24, 1948 |
| 2,445,712 | Forbes | July 20, 1948 |

FOREIGN PATENTS

| Number | Country | Date |
|---|---|---|
| 487,459 | Great Britain | June 21, 1938 |